Patented June 18, 1946

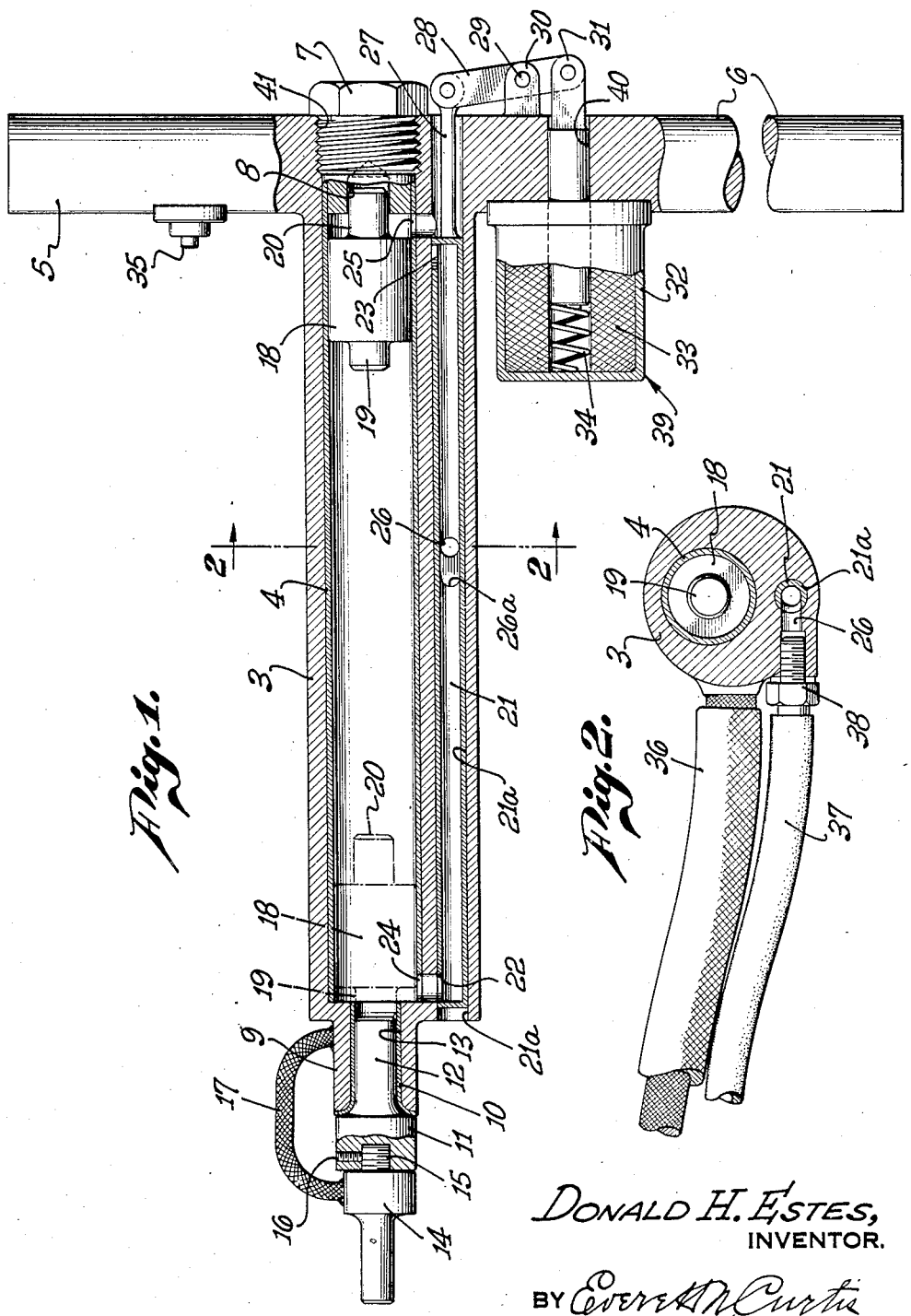

2,402,275

UNITED STATES PATENT OFFICE 2,402,275

POKEWELD GUN

Donald H. Estes, Lincoln Acres, Calif., assignor to Rohr Aircraft Corporation, Chula Vista, Calif., a corporation of California Application June 10, 1944, Serial No. 539,638

1 Claim. (Cl. 219—4)

My invention relates to pokeweld guns, and its objects are to provide a means within the gun itself for effecting impact of the welding tip both before and after the same is serving as an electrode of the welding circuit; to produce a better and more efficient weld than has heretofore been accomplished, particularly for the fastening together of sheet metal parts while the same are held in proper relationship upon a jig; to construct a pokeweld gun which is simple in construction, flexible as to movement and welding position, and capable of being handled by an operator with a minimum of instructions, and in general to simplify and render more effective the construction of the several parts. Other objects will appear from the drawing and as hereinafter set forth and described.

To spotweld two pieces of metal together, there are two main requirements; first, such pieces must be held together with sufficient pressure in the welding area at the exact instant that the welding is accomplished, and second, an electric current must be available in sufficient amount to heat said pieces to their melting temperatures in such welding area. To accomplish the necessary pressure, at the exact instant required, is an act difficult to bring about through the use of the usual handweld gun in the hands of an ordinary workman who, in attempting to apply such pressure manually through application of the welding tip to the work is, as a practical matter, unable to secure uniformity of result, and is almost certain to obtain a number of weak or imperfect welds. Furthermore, in the case of welding sheets of aluminum and its alloys, where relatively high pressures and temperatures are necessary for a proper and successful weld, it has been found impossible to secure any form of weld with prior handweld guns for a proper and successful weld.

The production of sheet metal parts of aluminum alloys for airplanes, and other structures incorporating such parts, often requires that the parts be fastened together upon a jig, so that they will hold the proper relationship to each other while being welded. This fastening usually takes the form of drilling holes through the parts, filling these holes with bolts or rivets, and then removing the parts from the jig and spotwelding between the fasteners. However, with my invention I propose to fasten these parts together by tackwelding on the jig, the jig forming one electrode of the welding circuit and the other electrode being the welding tip of the pokeweld gun. In addition to supplying the other electrode, this gun also through an air actuated piston within the barrel of said gun furnishes the welding pressure or impact needed to weld aluminum or its alloys. The gun can be moved readily to position and can be handled by the ordinary workman with simple instructions. In addition to the gun, a timing device, a source of air under pressure and a source of electrical current are required to make the spotweld.

Attention is hereby directed to the drawing, illustrating a preferred form of my invention, in which similar numerals of designation refer to similar parts throughout the several views, and in which—

Figure 1 is a longitudinal section of my improved pokeweld gun, showing the hammer piston and barrel acting as piston cylinder therefor, air valve and connections for impelling said piston, solenoid, electric connections, and mechanism for operating said valve, and welding tip serving as electric electrode and connecting parts; and Fig. 2 is a section on line 2—2 of Fig. 1 looking in the direction of the arrows, and showing the attachment of the cable for supplying electric current to the welding tip, and the air hose for supplying air under pressure to the piston cylinder.

Referring to the drawing, the barrel 3, which is the basic structure of my improved pokeweld gun, is made of copper, copper alloy or some other suitable electric conducting material. Closely fitting the bore of said barrel is the sleeve or lining 4, preferably circular in cross section, and serving throughout its length as a piston cylinder for the freely moving piston 18 therein. This piston 18 is also made preferably circular in cross section so as to fit and to conform to the passageway of said cylinder, and is preferably made with a large central body portion, having at the front and back thereof and integral therewith the tongues or shanks 19 and 20, respectively, for the purpose hereinafter described. Opening outwardly from said passageway near the ends thereof are the ports 24 and 25, which are situated to make registration with ports 22 and 23, respectively, located near the ends of the hollow valve rod 21 sliding within the passageway 21a, which is formed within the wall of the basic structure of the barrel 3.

At the central portion of the passageway 21a and opening inwardly into the same is the air inlet port 26, connected by the fitting 33 to the air hose 37, and registering with the slot 26a extending through the wall of the rod 21. Connected to the outer end of the rod 21 and preferably integral therewith is the extension 27, pivotally connected with the inner end of the lever 28 which is mounted to swing upon the fulcrum pin 29 affixed to the clevis 30 secured to the inner side of the handle 6. The handle 6 as well as the handle 5 are secured in any suitable way to the barrel 3, and serve as a convenient means of handling the gun. Pivotally connected with outer end of the lever 28 and extending through the opening 40, formed in the wall of the handle 6, is the armature 31 of the solenoid 39, the casing 32 of which is mounted upon the outer side of the handle 6, and which is provided with the usual field coils 33; a compression spring 34 within the hollow of said coils serving normally to keep said armature in extended position.

At the outer end of the barrel 3 is formed the hollow nose 9, the bore of which is preferably provided with the lining or sleeve 10, and which is shaped to form a socket 13 for the shank 12 of the tip holder 11; the head of this tip holder having an opening for the reception of the shank 15 of the welding tip 14, and being provided with a set screw 16 extending through its wall and engaging with said shank to retain the same in operative position. As will be observed the inner end of the shank 12 extends inwardly so as nearly to fill the socket 13, which is shaped to permit barely the entry of the front tongue or shank 19 of the piston 18 within the said socket, as shown in dotted lines in Fig. 1; thereby permitting the said piston to strike a sharp blow upon the shank 12 when impelled against the same in the manner hereinafter set forth. Both the said nose 9 and the tip 14 are of copper or other electric conducting material and are preferably connected by a bonding cable 17. In the inner end of the gun, between the handles thereof, and registering with the bore of the barrel 3, is the threaded opening 41, within which is received the threaded shank of the plug 7, provided with the socket or cushion 8, shaped to engage with the tongue or shank 20 of the piston 18.

At a place convenient to the hand of the operator, I preferably install and secure to one of the handles 5 of my improved gun, the button switch 35, which is operatively connected with a conventional electrical timing device employed through suitable connections to control in any manner well understood in the art the solenoid 39 and to control the current supplied through the cable 36. This timing device for firing the gun can be electronic or electro-mechanical in its design. Its functions, however, remain the same regardless of how they are accomplished. When the operator has positioned the gun against the metal sheets upon the jig serving as a negative electrode, preparatory to welding, he pushes the button switch 35 on the handle 5. This switch sets the timing device into action. Up until the time the button is pushed, compression spring 34 has held the solenoid armature 31 in the position shown in Fig. 1. This armature has in turn held hollow valve 21 in the position shown in Fig. 1 by means of valve connecting rod 27 and lever 28. With the valve in this position, compressed air enters hollow valve rod 21 through air hose 37 and air inlet port 26 and slot 26a communicating therewith. Thence, the compressed air passes from the inside of hollow valve rod 21 through ports 22 and 24 into the interior of barrel liner 4, thus forcing piston 18 to slide to the rear of the gun. As piston 18 moves up the passageway in barrel liner 4, the air occupying the space behind the piston is exhausted through rear port 25 into passageway 21a, past valve connecting rod 27, and escapes to the atmosphere. Upon reaching the rear of barrel liner 4, rear shank 20 of piston 18 enters the hollow of socket 8 upon the evacuation of said air, the general effect being to create an air cushion to prevent the impact of piston 18 from damaging barrel liner 4 or plug 7. Until the valve is again moved, the compressed air will now hold said piston in the rear of barrel liner 4.

When button switch 35 is pushed by the operator and held closed to set the timing device into operation, the first action of the timer will be to close the circuit of solenoid 39 to its current supply. This energizes the field coil 33 and magnetically attracts armature 31 which moves hollow valve rod 21 to a position such that the front port 24 in barrel liner 4 is opened into passageway 21a and thence to the atmosphere. At this juncture, front port 22 in hollow valve rod 21 is closed and rear port 23 of said rod 21 is aligned directly with rear port 25 of barrel liner 4, thus allowing compressed air to pass through ports 23 and 25 to rear of piston 18. As the result, the action of the air will be to send the piston down the passageway of barrel liner 4 at a high rate of speed until it strikes the face of the shank 12 of tip holder 11. This impact cold forms or cups the sheets of metal to be welded, thus reducing their surface resistance to a point where it is practicable to weld. Shortly after the said impact, the timing device closes the circuit of the welding current allowing this current to flow through welding current cable 36, through copper barrel 3, bonding cable 17, welding tip 14, material to be welded and the jig or negative electrode, and back to the current source. This welding current is of sufficient quantity to heat the sheets of metal to the point of fusion in the spotweld area. The welding current circuit remaining closed for a small fraction of a second, it is then opened by the timing device simultaneously with opening of the solenoid circuit, allowing spring 34 to return the hollow valve 21 to its original position and the piston 18 again to be returned to the rear of barrel liner 4 in the manner previously described. Immediately upon the piston 18 reaching the rear of barrel liner 4, the timing device again closes the solenoid circuit, sending piston 18 down barrel liner 4 until impact with tip holder shank 12 is attained. After this impact, the solenoid circuit is again opened, allowing the piston to return to rear of barrel liner 4 as previously described. The purpose of this second impact is to forge the weld, thus refining the crystalline grain structure and giving a weld of greater tensile and fatigue strength. No welding current is passed during this second impact. The time interval between passage of welding current and the second impact must be short enough that the weld has not had time to cool apreciably before the second impact takes place. After the second impact has taken place and the piston 18 has been returned to the rear of barrel liner 4 as described, the weld is complete. No further welding or timer action can take place until the operator releases button switch 35, which action will reset the timer so that all that is required to weld again is that operator again hold button switch 35 closed. During the entire operation, only sufficient body pressure to hold the gun in position is required of the operator.

The sequences following the pressure of the button 35 are mechanically or electrically operated without control by the operator, except that he is allowed to place the gun in welding position to effect the desired weld. Generally speaking, the first impact of the gun produces a slight cup or dimple and accomplishes approximately a one hundred per cent close touch of the two sheet metal parts over the contact area. This result makes it unnecessary for the operator to exert the pressure required in the operation of the prior handweld gun as employed by the ordinary workman. With my improved gun, such contact is brought about mechanically or electrically as aforesaid without said required exertion, and shortly after said contact or a small fraction of a second thereafter, the welding current is turned on momentarily to weld together automatically the two touching surfaces by reason of the aforesaid action of the timing unit. The last step of the sequence is again to produce automatically an additional impact upon the weld while it is still up to forging temperature; resulting in a final weld of better grain structure than has been obtained heretofore and resulting consequently in higher fatigue and tensile strength.

By the words "pokeweld gun" as used in this specification and claims, I desire to be understood as meaning a portable welding gun capable of being readily carried and held in the hands of the usual operator, and containing an electrode in the form of a welding tip and being provided with piston means capable of exerting impact pressure upon said tip.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

In a pokeweld gun, the combination of an electrode in the form of a barrel having an elongated enclosed passageway therein with inlet and outlet ports communicating with said passageway, a welding tip secured to one end of said electrode and forming part thereof, means for controlling and for temporarily energizing said electrode to effect a weld through said welding tip, a piston disposed within and shaped to make close sliding contact with said passageway, a sliding valve secured to said barrel for opening and closing said ports, a solenoid connected with said barrel for controlling said valve and for admitting and expelling air into and out of said passageway through said ports and causing said piston to be driven along said passageway and to effect striking impact upon said tip and thereafter to move away from the same, and means for controlling and temporarily energizing said solenoid.

DONALD H. ESTES.